United States Patent
Zajac et al.

[11] 3,862,587
[45] Jan. 28, 1975

[54] HYDRAULIC MOTOR

[75] Inventors: Theodore S. Zajac; Hal E. George, both of Rocky River, Ohio

[73] Assignee: Parker-Hannifin Corporation, Cleveland, Ohio

[22] Filed: Sept. 24, 1973

[21] Appl. No.: 399,855

[52] U.S. Cl. .................................................. 91/477
[51] Int. Cl. .............................................. F01b 3/10
[58] Field of Search .......... 417/269; 91/477; 74/800

[56] References Cited
UNITED STATES PATENTS

| | | | |
|---|---|---|---|
| 1,582,076 | 4/1926 | Onge | 74/800 |
| 2,545,929 | 3/1951 | Orshansky, Jr. | 91/477 |
| 2,661,700 | 12/1953 | Towler | 417/269 |
| 3,159,056 | 12/1964 | Blazo | 74/800 |
| 3,675,539 | 7/1972 | Zajac | 91/477 |

*Primary Examiner*—William L. Freeh
*Attorney, Agent, or Firm*—Donnelly, Maky, Renner & Otto

[57] ABSTRACT

An axial piston hydraulic motor especially suited for low speed-high torque applications as an actuator for large size valves such as gate, globe, plug, ball, and butterfly valves characterized in that coaxial high speed and low speed shafts are journaled in the motor housing with said high speed shaft having a bent axis portion on which a piston actuated nutating bevel gear member is journaled for nutation while the teeth of its coaxial bevel gears progressively mesh with bevel gears which are coaxial with said output shaft and which are respectively fixed in said housing and on said low speed shaft whereby a difference in number of teeth in either or both of the progressively meshing sets of bevel gears results in desired low speed-high torque driving of said output shaft and of the valve stem adapted to be coupled thereto. The hydraulic motor herein is further characterized in that the high speed shaft may be driven manually or by power means other than hydraulic to cause nutation of the nutating member and consequent low speed-high torque driving of the output shaft in the event of loss of hydraulic pressure for actuating the axial pistons of the motor.

10 Claims, 3 Drawing Figures

PATENTED JAN 28 1975

HYDRAULIC MOTOR

BACKGROUND OF THE INVENTION

Valve actuators are generally complex, expensive, and bulky units driven by electric motors and having, in addition to elaborate torque control units, multiple gear sets such as helical gear and worm gear sets for obtaining a low speed-high torque output for actuating large size valves such as gate, globe, plug, ball, and butterfly valves as used for example in power plant or marine applications. It is known in such electric motor actuated valve actuators to include manual drive means to enable valve actuation in the event of electrical power failure.

Axial piston nutating gear type hydraulic motors are known as for example disclosed in the U.S. Pat. No. 3,675,539 wherein a piston actuated nutating bevel gear progressively meshes with a bevel gear having a different number of teeth whereby the output shaft of the hydraulic motor is driven at reduced speed and increased torque dependent upon the number of teeth difference of the progressively meshing bevel gears. In said U.S. Pat. No. 3,675,539, the nutating bevel gear is nutatably keyed in the motor housing or on the output shaft and nutation thereof can be effected only by the hydraulically actuated pistons because there is no high speed shaft through which nutation of the nutating gear can be effected manually or by a power source other than hydraulic to achieve the desired low speed-high torque rotation of the output shaft as required for valve actuation in the event of loss of hydraulic pressure.

SUMMARY OF THE INVENTION

Contrary to known valve actuators employing electric drive motors, multiple gear sets, and complex torque control units, the present invention contemplates a simple and compact nutating hydraulic motor which has a low speed-high torque output shaft adapted to be coupled to the valve stem of a large size valve without requiring gear sets and torque control units as used in known electric motor driven valve actuators.

It is a principal object of this invention to provide an axial piston-nutating bevel gear hydraulic motor in which the motor housing has coaxial high speed and low speed shafts journaled therein with the nutating gear being journaled on a bent axis portion of the high speed shaft for nutational movement of said gear about its axis, the nutating gear progressively meshing with a bevel gear having a different number of teeth to effect driving of the output shaft at low speed and high torque.

It is another object of this invention to provide a hydraulic motor of the character indicated in which the housing has a fixed tracking gear with which the nutating gear also progressively meshes.

It is another object of this invention to provide a nutating gear hydraulic motor of the character indicated in which the bent axis high speed shaft is adapted to be driven manually or by a power source other than hydraulic to achieve desired low speed-high torque driving of the output shaft in the event of loss of hydraulic pressure.

It is another object of this invention to provide a nutating gear hydraulic motor of the character indicated in which the output shaft is hollow to accommodate axial movement of the valve stem to which it is adapted to be coupled as in connection with a gate valve or a rising stem globe valve.

Other objects and advantages will appear in the ensuing description.

DETAILED DESCRIPTION OF THE PREFERRED EMBODIMENTS

Figure 1:
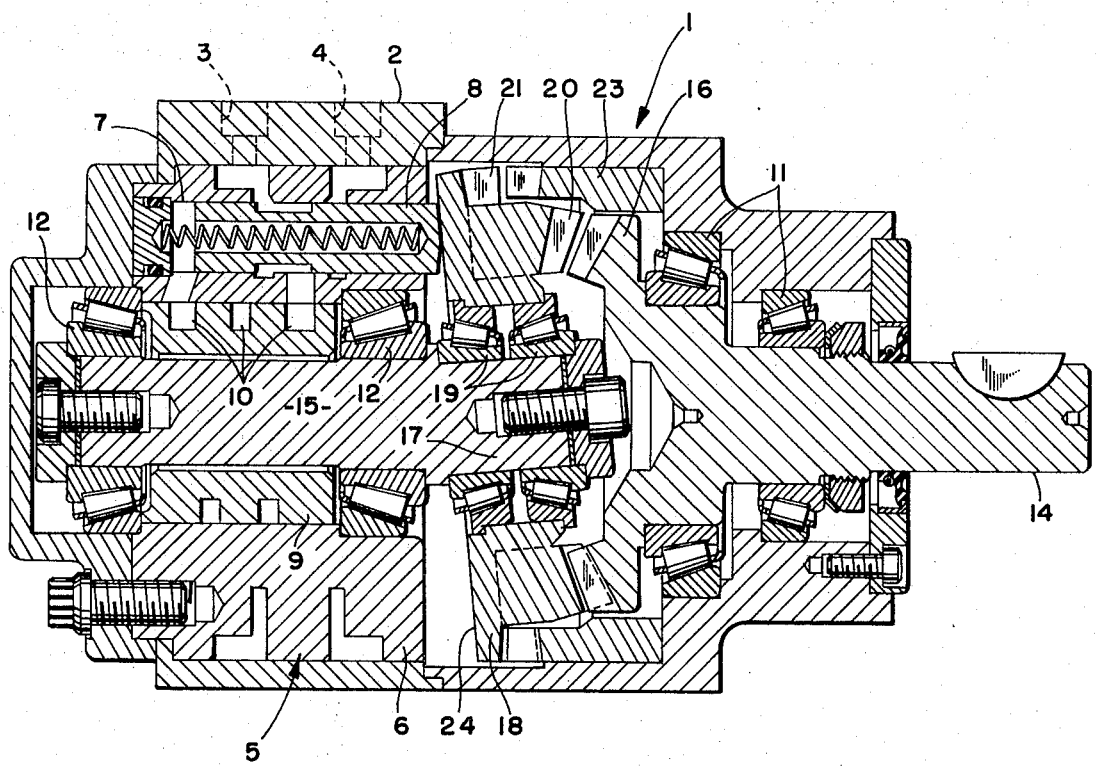
FIG. 1 is a cross-section view of a hydraulic motor embodying the present invention.

The hydraulic motor 1 illustrated in FIG. 1 comprises a housing assembly 2 having ports 3 and 4 which, in the case of a reversible hydraulic motor, are alternately inlet and return ports communicated with a pump and a tank as by a four-way valve. Fixed in the housing assembly 2 is a motor assembly 5 comprising a cylinder block 6 having a circular array of four (or a multiple thereof) equally spaced apart cylinder bores 7 in which the spring biased pistons 8 are reciprocable, and a distributor sleeve 9 which communicates the blind end of said cylindrical bores 7 successively with said ports 3 and 4 for hydraulic actuation of the respective pistons 8 in one direction and for exhausting fluid from the cylinder bores 7 when the pistons 8 are moved in the opposite direction, the pistons 8 constituting three-way valves as disclosed in the U.S. Pat. No. 3,675,539 to communicate the cylinder bores 7 which are 90° removed from the respective pistons 8 alternately with ports 3 and 4 via the helical grooves 10 of said distributor sleeve 9.

Journaled in the housing assembly 2 in bearings 11 and 12 are coaxial output and high speed shafts 14 and 15, the output shaft 14 having a bevel gear 16 coaxial therewith, and the high speed shaft 15 having a bent axis portion 17 on which the nutating member 18 is retained by the bearings 19 for nutation about its axis which coincides with the axis of portion 17 and which is at an angle with respect to and intersects the common axis of the output and high speed shafts 14 and 15, said nutating member 18 having coaxial bevel gears 20 and 21 which, during nutation of said nutating member 18 progressively mesh with the respective bevel gears 16 and 23 of which the latter is fixed in the housing assembly 2 coaxial with the output shaft 14. By providing at least a one tooth difference between bevel gears 20 and 16, each nutation cycle of the nutating member 18 will drive the output shaft 14 through an angle depending on the number of teeth difference between these bevel gears 20 and 16.

The bevel gears 21 and 23 preferably have the same number of teeth so that the bevel gear 23 constitutes a tracking gear to produce uniform nutation of the nutating member 18 as the nutating axis describes a conical path having its apex coinciding with the pitch cone apices of the bevel gears 16, 20, 21, and 23.

When the hydraulic motor 1 herein is employed as a valve actuator, the housing assembly 2 will be secured to the valve body (not shown) and the output shaft 14 will be coupled to the valve stem. When fluid under pressure is admitted into one port 3 or 4 and exhausted from the other port 4 or 3, the pistons 8 will successively be pressure actuated to the right as viewed in FIG. 1 against the tilted end face 24 to cause nutation of said nutating member 18 and such nutation will successively move the pistons 8 to the left to exhaust fluid through the port 4 or 3. As well known in the art, fluid under pressure may be selectively admitted through either port 3 or 4 by employing a four-way valve having ports connected to the motor ports 3 and 4, to a fluid pressure source such as a hydraulic pump, and to a tank. The output torque of motor 1 may be readily controlled by a pressure regulator and of course a relief valve may be employed to prevent overloading.

Figure 2:
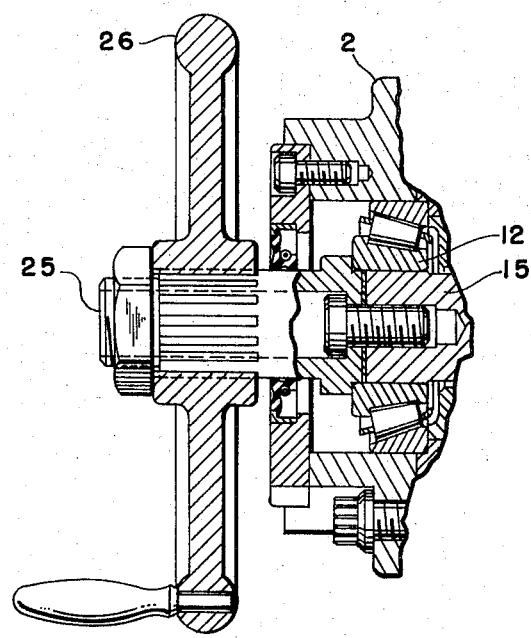
FIG. 2 is a fragmentary cross-section view showing an extension on the high speed shaft of the motor for optional low speed-high torque driving of the output shaft manually or by a power source other than the hydraulic power source.

Referring now to FIG. 2, the high speed shaft 15 has an extension 25 to which a suitable manual drive means such as a handwheel 26 is secured so that the high speed shaft 15 may be driven to nutate the nutating member 18, and thus drive the output shaft 14 at low speed and high torque. It is to be understood that the high speed shaft 15 instead of being turned by the handwheel 26 may be turned by a pneumatic nut runner or the like coupled to the extension 25.

Figure 3:
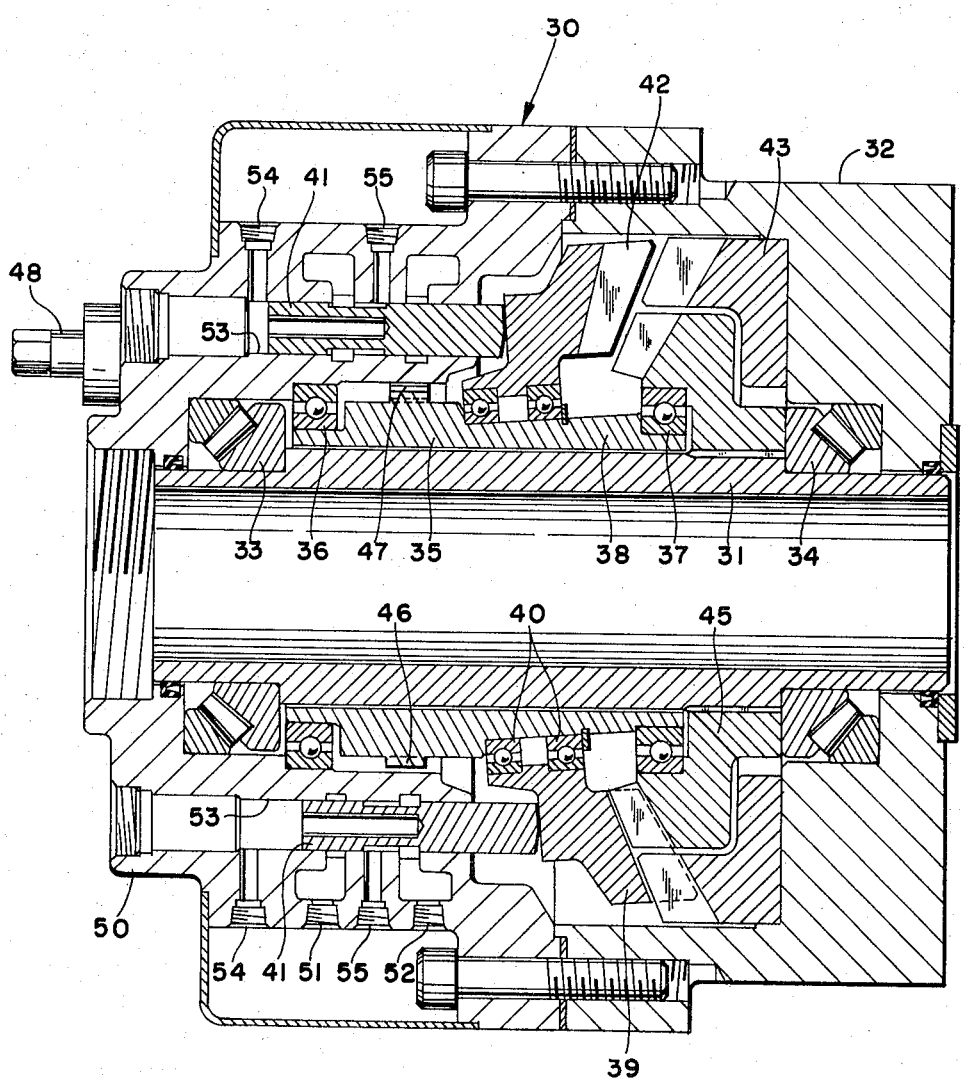
FIG. 3 is a cross-section view of another embodiment of the invention in which the output shaft is hollow to accommodate an axially movable stem of a valve such as a gate valve or a globe valve.

The hydraulic motor 30 illustrated in FIG. 3 is similar to that of FIG. 1 except that the low speed-high torque output shaft 31 is tubular and is journaled in the housing assembly 32 by bearings 33-34 and that the tubular high speed shaft 35 is journaled in the housing assembly 2 by bearings 36 and 37 and is provided with a bent axis portion 38 to which the nutating member 39 is secured by bearings 40 for nutation about its axis upon hydraulic actuation of the pistons 41 to progressively mesh the outer and inner portions of its bevel gear 42 respectively with the tracking gear 43 fixed in the housing assembly 32 and with the drive gear 45 which is splined on the output shaft 31. The bevel gears 42 and 45 on the nutating member 39 and on the output shaft 31 have different numbers of teeth to effect desired speed reduction and torque multiplication. In this case, the high speed shaft 35 has gear teeth 46 thereon with which the pinion 47 meshes, said pinion 47 being disposed between successive pistons 41 and having a shaft 48 which is adapted to be driven as by a pneumatic nut runner for turning the high speed shaft 35 and thus driving the nutating member 39 to effect driving of the output shaft 31 at low speed and high torque in the event of loss of hydraulic power. Obviously, the pinion shaft 48 may be rotated by other means such as a crank or a reversible flexible drive shaft from the power take off of an engine or the like.

In FIG. 3 the cylinder block 50 has ports 51 and 52 adapted to be connected by conduits (not shown) to the motor ports of a four-way valve for controlling the flow of fluid to and from the blind ends of the cylinder bores 53 in which the pistons 41 reciprocate via the three-way valves. Instead of a distributor sleeve 9 with helical grooves 10 as employed in FIG. 1, the cylinder block 50 has ports 54 and 55 which are interconnected by helical conduits (not shown) extending 90° from the successive ports 55 to the successive ports 54.

When the housing assembly 32 is secured to the body of a gate valve or a globe valve having axially movable valve stem operatively coupled to the tubular output shaft 31, said stem may move within the output shaft 31 during the opening or closing of such valve. In the event of loss of hydraulic pressure, high torque actuation of the valve may be accomplished by turning the pinion shaft 48 manually or by a power source other than hydraulic.

In addition to the hydraulic circuit components heretofore mentioned, it will be apparent that the speed of nutation of the nutating member 18 or 39 may be varied by a flow control valve in association with a fixed displacement pump or by adjustment of a variable displacement pump.

The embodiments of the invention in which an exclusive property or privilege is claimed are defined as follows:

1. A hydraulic motor comprising a stationary housing having coaxial high speed and output shafts journaled therewithin; said high speed shaft having a bent axis portion; a hydraulically actuated nutating member within said housing and axially retained and journaled on the bent axis portion of said high speed shaft to cause rotation of the latter and consequent nutation of said nutating member; said nutating member having coaxial bevel gear means which during nutation thereof progressively mesh with bevel gear means fixed in said housing and on said output shaft; the progressively meshing gear means on said nutating member and on said output shaft having at least a one tooth difference to effect low speed-high torque driving of the latter by nutation of said nutating member; said nutating member being hydraulically actuated by a circular array of axially movable pistons in said housing engaged with an inclined end face of said nutating member; and said high speed shaft having an axially outer end portion extending coaxially within said circular array of pistons.

2. The hydraulic motor of claim 1 wherein said axially outer end portion of said high speed shaft has means externally of said housing for driving the same independently of hydraulic actuation of said nutating member to cause nutation of said nutating member and consequent low speed-high torque driving of said output shaft.

3. The hydraulic motor of claim 1 wherein said high speed shaft is tubular and surrounds said output shaft said housing having a pinion gear and shaft extending to the exterior of said housing and rotatable therein about an axis parallel to the axis of said high speed shaft with said pinion gear meshing with teeth around the axially outer end portion of said high speed shaft whereby said high speed shaft may be driven by said pinion gear independently of hydraulic actuation of said nutating member to cause nutation of the latter and consequent driving of said output shaft at low speed-high torque.

4. The hydraulic motor of claim 1 wherein said bevel gear means on said output shaft is at the axially inner end of said output shaft and wherein said bent axis portion of said high speed shaft is at the axially inner end portion of said high speed shaft.

5. The hydraulic motor of claim 4 wherein said axially outer end portion of said high speed shaft extends through said housing for high speed rotation by means other than hydraulic thus to cause nutation of said nutating member in the event of loss of hydraulic pressure.

6. A hydraulic motor comprising a housing having inlet and return ports; coaxial high speed and output shafts journaled in said housing; said high speed shaft having a bent axis portion; a nutating member axially retained and journaled on the bent axis portion of said high speed shaft; said nutating member having a face on one side thereof normal to said bent axis portion and bevel gear means on the other side coaxial with said bent axis portion; said housing having a cylinder block with a circular array of cylinder bores coaxial with said high speed and output shafts; pistons reciprocable in the respective cylinder bores and engageable with said face on said one side of said nutating member; valve means effective to alternately communicate said cylinder bores with said inlet and return ports whereby said pistons are moved in one direction against said face of said nutating member by fluid under pressure from said inlet port thus to cause nutation of said nutating member and are moved in the opposite direction by such nutation of said nutating member to return fluid to said return port; coaxial bevel gear means respectively fixed in said housing and on said output shaft with which the bevel gear means of said nutating member progressively mesh during nutation of said nutating member, there being at least a one tooth difference in at least one set of the progressively meshing bevel gear means whereby said output shaft is driven by nutation of said nutating member; said high speed shaft having an axially outer end portion extending coaxially within said cylinder block.

7. The hydraulic motor of claim 6 wherein said tooth difference is between the progressively meshing bevel gear means of said nutating member and said output shaft.

8. The hydraulic motor of claim 6 wherein said axially outer end portion of said high speed shaft has means externally of said housing for driving the same independently of said pistons to effect nutation of said nutating member and consequent driving of said output shaft.

9. The hydraulic motor of claim 6 wherein said bevel gear means on said output shaft is at the axially inner end of said output shaft and wherein said bent axis portion of said high speed shaft is at the axially inner end portion of said high speed shaft.

10. The hydraulic motor of claim 9 wherein said axially outer end portion of said high speed shaft extends through said housing to the exterior thereof for rotation by means other than hydraulic thus to cause nutation of said nutating member in the event of loss of hydraulic pressure.

\* \* \* \* \*